(12) United States Patent
Patron

(10) Patent No.: US 7,094,335 B2
(45) Date of Patent: Aug. 22, 2006

(54) AQUARIUM FILTRATION SYSTEM

(76) Inventor: Javier Patron, 987 Barrett Ave., Chula Vista, CA (US) 91911

( * ) Notice: Subject to any disclaimer, the term of this patent is extended or adjusted under 35 U.S.C. 154(b) by 40 days.

(21) Appl. No.: 10/768,881

(22) Filed: Jan. 29, 2004

(65) Prior Publication Data

US 2004/0182767 A1   Sep. 23, 2004

Related U.S. Application Data

(60) Provisional application No. 60/444,587, filed on Jan. 31, 2003.

(51) Int. Cl.
 C02F 3/04    (2006.01)
 A01K 63/04   (2006.01)
 B01D 24/00   (2006.01)
(52) U.S. Cl. ............. 210/151; 210/169; 210/232; 210/416.2; 210/617; 210/905; 119/260
(58) Field of Classification Search ............ 210/150, 210/151, 169, 232, 416.1, 416.2, 615–618, 210/905; 119/259, 260
See application file for complete search history.

(56) References Cited

U.S. PATENT DOCUMENTS

| | | | | |
|---|---|---|---|---|
| 3,957,017 A * | 5/1976 | Carmignani et al. | ........ | 119/227 |
| 4,427,548 A * | 1/1984 | Quick, Jr. | ........ | 210/617 |
| 4,844,013 A * | 7/1989 | de Haan et al. | ........ | 119/248 |
| 4,988,436 A * | 1/1991 | Cole | ........ | 210/169 |
| 5,084,164 A | 1/1992 | Del Rosario | | |
| 5,108,594 A * | 4/1992 | Giovanetti et al. | ........ | 210/151 |
| 5,306,421 A * | 4/1994 | Weinstein | ........ | 210/151 |
| 5,389,248 A * | 2/1995 | Pare et al. | ........ | 210/151 |
| 5,460,722 A * | 10/1995 | Chen | ........ | 210/615 |
| 5,628,905 A * | 5/1997 | Montalbano | ........ | 210/615 |
| 5,667,671 A | 9/1997 | Munsch et al. | | |
| 5,868,926 A * | 2/1999 | Hickok et al. | ........ | 210/150 |
| 5,910,248 A * | 6/1999 | Tlok | ........ | 210/608 |
| 5,958,239 A * | 9/1999 | Sing | ........ | 210/605 |
| 6,008,028 A * | 12/1999 | Bender et al. | ........ | 435/177 |
| 6,156,209 A * | 12/2000 | Kim | ........ | 210/703 |
| 2004/0129619 A1* | 7/2004 | Leach | ........ | 210/169 |
| 2004/0164011 A1* | 8/2004 | Geudtner | ........ | 210/169 |

FOREIGN PATENT DOCUMENTS

| | | | | |
|---|---|---|---|---|
| AT | 397381 B | * | 3/1994 | |
| DE | 29607044 | | * | 2/1997 |
| GB | 2198051 A | * | 6/1988 | |

OTHER PUBLICATIONS

Correspondence from AQUARIA, Inc. dated Jan. 31, 2005 in 48 pages.

* cited by examiner

*Primary Examiner*—Fred G. Prince
(74) *Attorney, Agent, or Firm*—Knobbe, Martens, Olson & Bear LLP

(57) ABSTRACT

A filter system for use with an aquarium includes a housing having a pre-filter chamber, a biological chamber, and a sump. A protein skimmer receives water flowing from the pre-filter chamber and returns the water to the pre-filter chamber, such that a portion of the water flows through the protein skimmer several times before being returned to the aquarium. The biological chamber has a drip drawer holder having drip drawers for holding filter media pads and dispersing water substantially evenly over biological media in the biological chamber.

13 Claims, 3 Drawing Sheets

AQUARIUM FILTRATION SYSTEM

CROSS-REFERENCE TO RELATED APPLICATIONS

This application claims priority to U.S. Provisional Application Ser. No. 60/444,587, filed Jan. 31, 2003, the disclosure of which is herein incorporated by reference in its entirety.

BACKGROUND OF THE INVENTION

1. Field of the Invention

The invention relates to an aquarium filter system, and more particularly, to an improved housing for an aquarium filter system.

2. Description of the Related Art

To insure the health of marine animals and plants that live in aquariums, it is necessary to maintain the cleanliness, purity and health of the water. Examples of impurities, which commonly degrade the aquarium environment, are organic wastes, such as fish feces and uneaten food, chemicals in unpurified water and common house dust. Any of these impurities can affect the desired chemical balance of the water and, in particular, the ammonia nitrate cycle, which results from the break-down process of nitrogenous waste. The rate of rise of the nitrate concentration greatly affects the environment within the aquarium and, to a large extent, the level of nitrates determines the frequency that the water must be changed. Accordingly, a great number of products for filtering and treating aquarium water have been developed.

On smaller fresh water aquariums, filtering may only consist of a simple filtering element for controlling water circulation, and an aeration system. On larger aquariums, and particularly salt water aquariums where delicate varieties of fish and other marine life live, a more complex filtering system must be utilized, such as filters that use chemical and biological filtration.

Chemical filtration, which facilitates the removal of, or deactivation of, organic substances is well known in the art. Activated carbon and ion-exchange resins are commonly used materials in this type of filtration. While this type of filtration is frequently utilized, it is generally ineffective for purifying the water and eliminating many of the commonly known nitrogenous waste products.

The use of biological aerobic filtration is also important because it serves to convert toxic ammonia to nitrates, thus forming a complete ecosystem. Filters which provide aerobic filtration, such as wet/dry and chemical filtration, can be complex, inefficient, large and expensive. Various types of biological filters are known. These filters often include a separate component or chamber providing mechanical filtration and an aerobic component or chamber providing the wet/dry filtering. Most of these type of filters use siphon tubes to remove water from the tank and a pump to return the filtered water.

Wet/dry filtration systems work by running water over a vast surface area, usually through a drip plate and a chamber containing biomedia with water dripping over it. Biomedia, such as bio balls, having a large surface area is commonly available. Nitrifying bacteria grow on the surface area of the biomedia. These filtration systems therefore provide a large surface area for nitrifying bacteria to grow and greater water surface coverage for the exchange of gases. One known biological filter is a trickle filter. In a conventional trickle filter, water passes through a trickle section of the filter and takes on dissolved gases by diffusion. Water draining from the aquarium is coarsely prefiltered to keep out large chunks of detritus such as dead fish, snails, etc. This filter is commonly used in combination with a protein skimmer which continually segregates a portion of the water from the pre-filter and removes certain dissolved organic material.

It has become apparent that there is a need for an integrated water filter system which will satisfy the requirements of the various marine life housing situations, and provide mechanical and aerobic filtration, that is conveniently and easily installed, used and maintained.

SUMMARY OF INVENTIVE FEATURES

One embodiment of the invention is a filter system for use with an aquarium and a protein skimmer. The filter system has a housing with a pre-filter chamber, wherein the chamber provides a pre-filter configured to collect and filter water from the aquarium and the protein skimmer. The housing also has a biological chamber for holding biological media, and at least one drip drawer having a plurality of bores therein to distribute water substantially evenly over the biological media. In another embodiment, the housing also has a sump, wherein water is directed from the pre-filter chamber to the sump chamber through a trough formed by at least one diverter partition forming a boundary between the sump chamber and the pre-filter chamber, wherein a portion of the water flowing through the trough is directed to the protein skimmer.

BRIEF DESCRIPTION OF THE DRAWINGS

These and other objects and features of the invention will become more fully apparent from the following description and appended claims taken in conjunction with the following drawings, where like reference numbers indicate identical or functionally similar elements.

DETAILED DESCRIPTION OF THE INVENTION

A detailed description of an embodiment of the invention is provided below. While the invention is described in conjunction with that embodiment, it should be understood that the invention is not limited to any one embodiment. On the contrary, the scope of the invention is limited only by the appended claims, and the invention encompasses numerous alternatives, modifications and equivalents. For the purpose of example, numerous specific details are set forth in the following description in order to provide a thorough understanding of the invention. The invention may be practiced according to the claims without some or all of these specific details.

Figure 1:
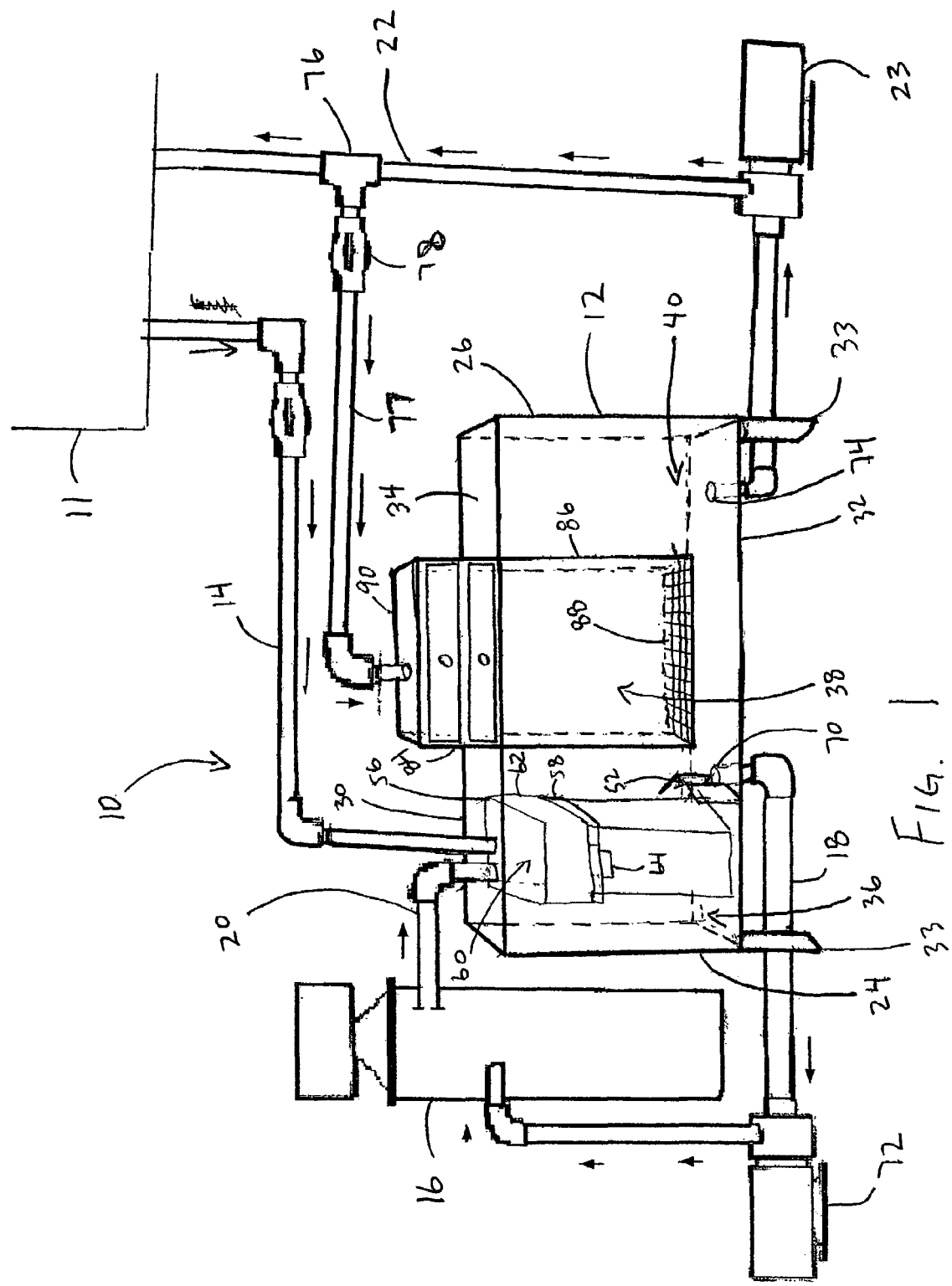
FIG. 1 is a plan view of a filter system for use with an aquarium according to one embodiment of the invention.

FIG. 1 illustrates an aquarium filter system 10 for use in maintaining the purity, cleanliness and biological health of water in an aquarium 11. In one embodiment, the aquarium filter system 10 has a housing 12 enclosing various filter components as will be discussed below. Water from the aquarium 11 is conveyed to the filter system 10 though an aquarium outlet conduit 14. The aquarium outlet conduit 14, as well as any conduit described herein, can be constructed of any rigid or flexible material that can transport the water flowing through the aquarium and filter system. The conduits, however, are typically constructed of a plastic with polyvinyl chloride (PVC) being the preferred type of plastic.

A protein skimmer 16 is connected to the housing 12. Water from the filter system 10 is conveyed to the protein skimmer 16 through a skimmer inlet conduit 18. The use and operation of protein skimmers is well known to those skilled in the art, therefore, a description of workings of the protein skimmer 16 will not be provided herein. One exemplary protein skimmer is the Red Berlin Classic Protein Skimmer manufactured by Red Sea of Houston, Tex. Water is returned to the filter system 10 from the protein skimmer 16 through a skimmer outlet conduit 20.

FIG. 1 further illustrates that water is conveyed from the filter system 10 to the aquarium 11 through an aquarium inlet conduit 22. In one embodiment, the aquarium inlet conduit 22 is a pipe, preferably made of PVC, however other suitable conduits can also be used. In one embodiment, an externally located water pump 23 is used to pump the filtered water from the filter system 10 into the aquarium 11.

The housing 12 is preferably constructed of a thermoplastic resin, such as plexiglass, however, other durable and easily cleaned materials such as glass and molded plastic may also be used. The housing 12 consists of a first side member 24, a second side member 26, a front member 28, a rear member 30 and a lower member 32. The various members of the housing 12 are bonded together, or molded, through any method known in the art to create a water-tight box. Preferably, the upper end 34 of the housing 12 is open. The lower member 32 has a number of feet 33 attached thereto. Located within the housing 12 is a pre-filter chamber 36, a biological chamber 38, and a sump chamber 40.

Figure 2:
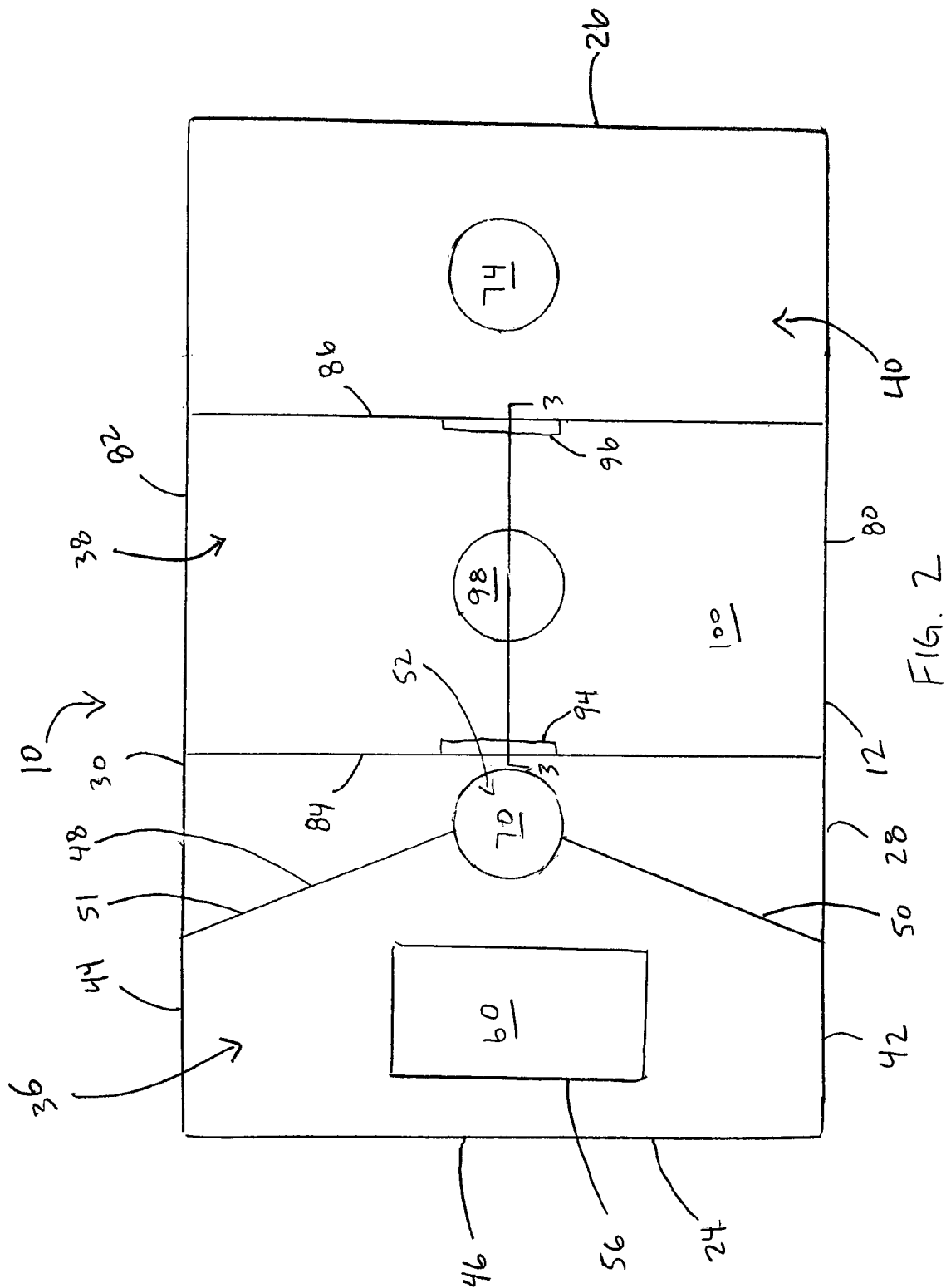
FIG. 2 is an overhead view of the housing of the filter system of FIG. 1.

As shown in FIG. 1 and in FIG. 2, which is an overhead view of the filter system 10, the pre-filter chamber 36, has front and rear sides 42, 44 that are formed from a portion of the front and rear members 28, 30 of the housing 12. The pre-filter chamber 36 has an outer side 46 that is formed by the first side member 24 of the housing 12. Additionally, as best seen in FIG. 2, the pre-filter chamber 36 has an inner side 48 dividing the pre-filter chamber 36 from the sump chamber 40. In one embodiment, the inner side 48 is formed from a first diverter partition 50 extending from the front member 28 and a second diverter partition 51 extending from the rear member 30 as shown in FIG. 2 toward the middle of the housing 12. A gap or trough 52 remains between the first diverter partition 50 and the second diverter partition 51. The trough 52 allows water to flow from the pre-filter chamber 36 to the sump chamber 40. Generally, the first and second diverter partitions 50 and 51 have a height between 2 and 10 inches, preferably between 3 and 8 inches, and more preferably about 4 to 6 inches. In one embodiment, the height of the diverter partitions is any size up to the height of the housing 12. Although the sump chamber 40 has been described as having first and second diverter partitions, it is envisioned that any number of diversionary mechanisms known to those of skill in the art may be used to divert water from the pre-filter chamber to the sump chamber, such as, but not limited to, valves, reservoirs, diversion conduit or other diversion pathways, a slideable rod element in a gearshift-type valve mechanism, and combinations thereof.

As shown in FIG. 1, the aquarium outlet conduit 14 conveys water from the aquarium 11 to a pre-filter bag 56 housed in the pre-filter chamber 36. In one embodiment, the pre-filter bag 56 is positioned such that a mouth 60 is formed in the open end of the bag 56 for receiving the water from the aquarium outlet conduit 14. The pre-filter bag 56 is configured to catch and remove debris such as uneaten fish food, detritus, solids, and algae from the water as the water passes through the pre-filter bag 56. In one embodiment, the pre-filter bag 56 is a micron bag configured to filter micron-size particles from the water. In one embodiment, the bag is made from a felt material.

A rigid pre-filter holder 58 is used to hold the pre-filter bag 56 in an open configuration, thereby forming the open mouth 60 through which the aquarium water is received into the pre-filter bag 56. In one embodiment, the pre-filter holder 58 is a rectangular band and an upper edge 62 of the pre-filter bag 56 is folded over the pre-filter holder 58 to secure the pre-filter bag 56 to the pre-filter holder 58. Supports 64 attached to the front member 28 and the rear member 30 engage the pre-filter holder 58 to hold the pre-filter bag 56 in the desired position. Preferably, the supports 64 removably engage the pre-filter holder 58 allowing the pre-filter holder 58 to be removed from the housing 12 as needed to replace or clean the pre-filter bag 56. Although the pre-filter holder 58 has been described as having a rectangular shape, it is conceived that other shapes of pre-filter holders, such as square, circular or any other shape that positions the mouth 60 of the pre-filter bag 56 to allow water flowing from the aquarium 11 to be directed into pre-filter bag 56.

The lower member 32 of the housing 12 has a first opening 70 therein to which the skimmer input conduit 18 is connected. Preferably, the first opening 70 is located beneath the trough 52 between the diverter partitions 50, 51 such that substantially all of the water passing through the pre-filter bag 56 passes over the first opening 70. A protein skimmer pump 72 positioned in the protein skimmer input conduit 18 draws water as it passes through the trough 52 through the first opening 70 and supplies the water to the protein skimmer 16. Preferably, the protein skimmer pump 72 draws a desired amount of flow for the protein skimmer 16 and pumps it through the protein skimmer. The excess water passing through the trough 52 that is not drawn through the first opening 70 and into the protein skimmer 16 flows into the sump chamber 40. Advantageously, the first opening 70 is positioned through the lower member 32 so that a portion of the water coming from the protein skimmer is returned to the protein skimmer for further processing. Of course, it should be understood, that the direction of the inlet conduit 18 is not limited to the direction shown in the figures. Others of ordinary skill in the art could design a similar system with the inlet conduits emanating from other directions.

After passing through the protein skimmer 16, the water from the protein skimmer 16 is conveyed through the skimmer outlet conduit 20 and is returned to the filter system 10. The skimmer outlet conduit 20 directs the water into the pre-filter bag 56 where the water returning from the protein skimmer 16 is joined with water from the aquarium 11 being conveyed by the aquarium outlet conduit 14. The water then passes through the pre-filter bag 56 and passes through the trough 52 between the diverter partitions 50, 51 as discussed above. Thus, some of the water passing through the filter system 10 preferably passes through the protein skimmer 16 multiple times before being pumped to the aquarium 11. In one embodiment, water passing through the protein skimmer 16 numerous times increases the efficiency and effectiveness of the protein skimmer.

As shown in FIG. 1, the sump chamber 40 is adjacent to the pre-filter chamber 36. Preferably, the upper portion 34 of the housing 12 is open, allowing additives to be mixed into the water in the sump chamber 40. A housing outlet opening 74 is located in the sump chamber 40 in the lower member 32. The aquarium inlet conduit 22 is attached to the housing outlet opening 74, allowing water from the sump chamber 40 to be drawn into the aquarium inlet conduit 22. The water pump 23 in the aquarium inlet conduit 22 pumps the filtered water from the filter system 10 into the aquarium 11.

In one embodiment, a tee-valve 76 is located in the aquarium inlet conduit 22 allowing a portion of the water that passes through the pump 23 to be directed to a biological chamber inlet conduit 77 connected to the biological chamber 38. In one embodiment, a ball valve 78 positioned in the biological chamber inlet conduit 77 controls the amount of flow that is directed to the biological chamber 38. In an alternate embodiment, a power head pump (not shown) is located in the sump chamber 40. The power head pump directs water directly from the sump chamber 40 into the biological chamber inlet conduit 77.

The biological chamber 38, as shown in FIGS. 1 and 2, has front and rear sides 80, 82 that are formed from the front and rear members 28, 30 respectively of the housing 12. The biological chamber 38 has a first side 84 and a second side 86 that extend from the front and rear members 28, 30 as shown in FIG. 2. The bottom of the biological chamber 38 is formed of a grating 88 made of a plastic material and contain a multiplicity of openings which permit water to drain by gravity through the bottom area of the biological chamber 38 and into the sump chamber 40. In one embodiment, the biological chamber 38 is filled with biological media, such as bio balls. Water is allowed to drain over the surfaces of the biological media and through the grating 88 and into the sump chamber 40. The use and operation of biological media is well known to those skilled in the art, therefore, a description of workings of the biological media will not be provided herein.

Figure 3:
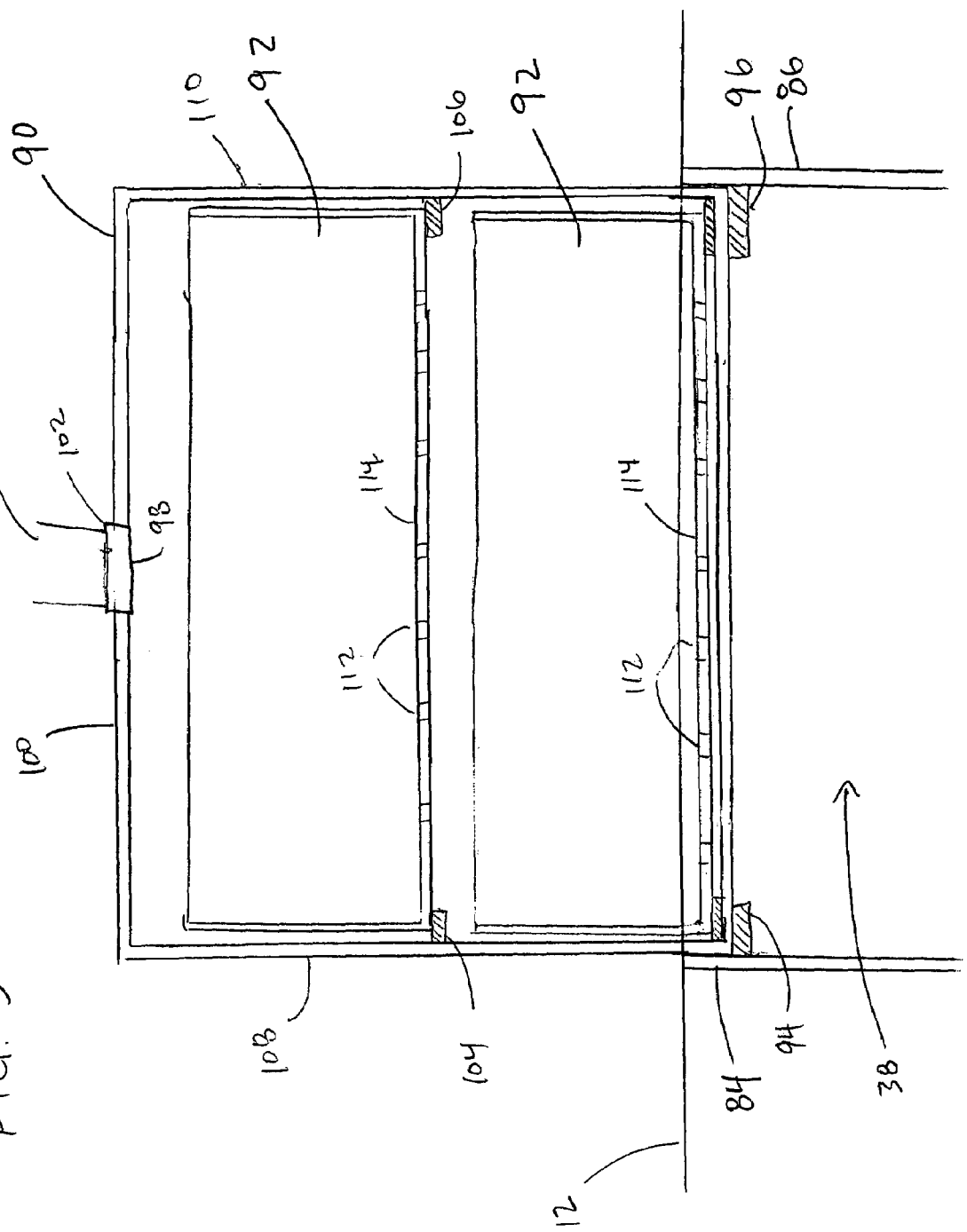
FIG. 3 is a cross sectional view of a drip drawer holder taken along line 3—3 of FIG. 2.

FIG. 3 illustrates that a drip drawer holder 90 having two drip drawers 92a,b is positioned above the biological chamber 38. Although the embodiment shown has two drip drawers 92a,b, any number of drip drawers, such as one, three, or more can be used. In one embodiment, the drip drawer holder 90 is sized such that a portion of the drip drawer holder 90 fits into the biological chamber 38 and rests on a first ledge 94 on the first side 84 and a second ledge 96 on the second side 86. Alternately, the first and second ledges 92 and 94 may attach to the front and rear member 28, 30 respectively. In one embodiment, the drip drawer holder 90 sits inside the perimeter of the biological chamber 38 to help prevent salt creep. Preferably, the drip drawer holder 90 can be removed from the housing 12 and turned about 180 degrees to allow the hobbyist to access the drip drawers 92 from the opposite side of the housing 12 to accommodate various configurations of aquarium cabinets. The biological filter supply line 78 connects to a biological chamber opening 98 in a top surface 100 of the drip drawer holder 90. In one embodiment, the biological filter supply line 78 threadedly engages with a collar 102 surrounding the biological chamber opening 98.

In the embodiment shown in FIG. 3, two drip drawers 92 are placed in the drip drawer holder 90. The first drip drawer 92 is placed above the second drip drawer 92 and is supported by ledges 104, 106 on a first side 108 and a second side 110 of the drip drawer holder 90. Preferably the front portion of the drip drawer holder 90 is open, thereby allowing the drip drawers 92a,b to be removed. The drip drawers 92a,b hold media filter pads, such as activated carbon bags, charcoal pads, active resins, chemical filtration pads, such as phosphate remover, nitrate remover, or any other filter pads as is known in the art.

Water passes through the biological chamber opening 98 and into the drip drawers 92a,b. The drip drawers are typically made of a plastic material and contain a multiplicity of openings or bores 112 in a bottom plate 114 thereof which permit water to drain by gravity to the biological media in the biological chamber 38. The bores 112 are spread over the bottom plate 114 to allow the incoming water to be substantially evenly dispersed over the biological chamber 38. Preferably, the bores are counter-synced on the top and bottom to promote water passing through the bores.

When the filter system of FIG. 1 is in use, water flows from the aquarium 11 to the filter system 10. Water first enters the pre-filter bag 56 housed in the pre-filter chamber 36. The water passes through the pre-filter bag and then through the trough 52 between the diverter portions, or other diversionary element as described above. A portion of the water is directed through the first opening 70 to the protein skimmer 16. Water passing through the protein skimmer 16 is returned to the pore-filter bag 56, where it mixes with water coming from the aquarium 11. The water flowing through the trough 52 that does not pass through the protein skimmer 16, passes into the sump chamber 40. The water pump 23 pumps water from the sump chamber 40 back toward the aquarium 11 through the aquarium inlet conduit 22. A portion of the water passing through the pump 23 is directed to the biological chamber 38. The water passing through the biological chamber passes through the drip drawers 92 and trickles over the biological media and drains into the sump chamber 40. The water passing through the pump 23 that is not directed to the biological chamber 38 is returned to the aquarium 11.

While the invention has been described in complete detail and pictorially shown in the accompanying drawings, it is not to be limited to such details, since many changes and modifications may be in the invention without departing from the spirit and the scope thereof. While the above detailed description has shown, described, and pointed out fundamental novel features of the invention as applied to various embodiments, it will be understood that various omissions and substitutions and changes in the form and details of the system illustrated may be made by those skilled in the art, without departing from the intent of the invention.

What is claimed is:

1. A filter system for use with an aquarium and a protein skimmer, the filter system comprising:
    a housing comprising a pit-filter chamber having a pre-filter configured to collect and filter water from both the aquarium and the protein skimmer; and
    a sump chamber, wherein water is directed from the pre-filter chamber to the sump chamber, and wherein a portion of the water flowing from the pre-filter to the sump chamber is directed to the protein skimmer by gravity and suction, such that a desired quantity of water is passed through the protein skimmer a plurality of times before being directed to the aquarium.

2. The filter system of claim 1, wherein the sump chamber comprises a diverter configured to divert the desired quantity of water exiting the pre-filter from the sump chamber to the protein skimmer.

3. The filter system of claim 2, wherein the diverter comprises a trough.

4. The filter system of claim 3, wherein the trough is formed by two molded vertically inwardly extending partitions formed in the sides of said housing, said partitions dividing the interior of the housing into the pre-filter chamber and the sump chamber.

5. The filter system of claim 1, further comprising a biological filter chamber and a pump, wherein the pump is configured for pumping water from the sump chamber to the biological filter chamber and the aquarium, and wherein water from the biological filter chamber is directed to the sump chamber.

6. A method of filtering an aquarium comprising:
collecting water from the aquarium and a protein skimmer;
filtering said collected water;
directing a first portion of said filtered water to the protein skimmer;
directing a second portion of said filtered water to the aquarium;
directing a third portion of said filtered water to at least one drip drawer in a biological chamber, wherein the drip drawer comprises a plurality of bores for distributing water evenly over biological media; and
distributing said water substantially evenly over said biological media in the biological chamber.

7. The method of claim 6, further comprising returning said water from the biological media to the aquarium.

8. The method of claim 6, further comprising directing said third portion of said filtered water to a second drip drawer.

9. A method of filtering an aquarium comprising:
collecting water from the aquarium;
directing said water to at least one removable drip drawer in a biological chamber,
wherein the drip drawer comprises a plurality of bores for distributing water evenly over biological media, wherein said at least one removable drip drawer is rotatable so as to be removed from said biological chamber in a first direction and a second direction; and
distributing said water substantially evenly over said biological media in the biological chamber.

10. The method of claim 9, further comprising filtering said collected water prior to directing said water to said at least one removable drip drawer.

11. The method of claim 10, further comprising diverting a portion of said filtered water to a protein skimmer, and re-filtering water from said protein skimmer, such that at least a portion of said water directed to said at least one removable drip drawer has been filtered and passed through the protein skimmer.

12. The method of claim 9, further comprising diverting a portion of the water output from the biological chamber back to the at least one removable drip drawer.

13. The method of claim 9, further comprising a pre-filter configured to filter water from an aquarium before said water is directed to said biological chamber.

* * * * *